US008724586B2

(12) United States Patent
Hallenstål et al.

(10) Patent No.: US 8,724,586 B2
(45) Date of Patent: May 13, 2014

(54) MOBILITY SOLUTION INDICATOR FOR VOICE OVER EVOLVED PACKET SYSTEM (EPS)

(75) Inventors: Magnus Hallenstål, Täby (SE); Göran Rune, Linköping (SE)

(73) Assignee: Optis Cellular Technology, LLC, Plano, TX (US)

( * ) Notice: Subject to any disclaimer, the term of this patent is extended or adjusted under 35 U.S.C. 154(b) by 133 days.

(21) Appl. No.: 13/144,947

(22) PCT Filed: Jan. 22, 2010

(86) PCT No.: PCT/IB2010/000117
§ 371 (c)(1),
(2), (4) Date: Jul. 18, 2011

(87) PCT Pub. No.: WO2010/084416
PCT Pub. Date: Jul. 29, 2010

(65) Prior Publication Data
US 2011/0274090 A1 Nov. 10, 2011

Related U.S. Application Data (60) Provisional application No. 61/146,462, filed on Jan. 22, 2009.

(51) Int. Cl.
H04W 4/00 (2009.01)
(52) U.S. Cl.
USPC ........................................................ 370/331
(58) Field of Classification Search
USPC ......... 370/203, 204–215, 229–240, 310–337, 370/338–350, 394, 395.1, 395.3, 395.4, 370/395.41, 395.42, 395.5, 395.52, 395.53, 370/412–421, 431–529
See application file for complete search history.

(56) References Cited

U.S. PATENT DOCUMENTS

2009/0088159 A1* 4/2009 Wu et al. ....................... 455/436
2009/0268722 A1* 10/2009 Gallagher et al. ............. 370/352
2011/0044327 A1* 2/2011 Mahdi et al. .................. 370/352

FOREIGN PATENT DOCUMENTS

WO WO 2010/044729 A1 4/2010

OTHER PUBLICATIONS

Alu et al: "New Architecture Alternative 1-22 for CS services over EPS" 3GPP Draft; S2-088132_Combined 763L7575_V7; 3rd Generation Partnership Project (3GPP) , Mobile Competence Centre, 650 , Route Des Lucioles, F-06921 Sophia-Antipolis Cedex , France, No. Miami; 20081121, Nov. 21, 2008, XP050332479.
"3rd Generation Partnership Project; Technical Specification Group Services and System Aspects; Study on Circuit Switched (CS) domain services over evolved Packet Switched (PS) access; Stage 2 (Release 9)" 3GPP Standard; 3GPP TR 23.879, $3^{rd}$ Generation Partnership Project (3GPP), Mobile Competence Centre ; 650, Route Des Lucioles ; F-06921 Sophia-Antipolis Cedex; France, No. VI.2.0, Jan. 1, 2009, XP050364077.

(Continued)

Primary Examiner — Jung-Jen Liu
(74) Attorney, Agent, or Firm — Vincent J. Allen; Carstens & Cahoon, LLP (57) ABSTRACT Embodiments of the present invention described herein include a Mobile Management Entity and a method that receive a handoff request for an active voice session of a terminal which is leaving an E-UTRAN to a GERAN/UTRAN and then determine if the handoff request is applicable to a SRVCC procedure or a CSoLTEvGAN procedure.

20 Claims, 6 Drawing Sheets (56) References Cited

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access(Release 8). 3GPP TS 23.401 v8.3.0 (Sep. 2008).

3rd Generation Partnership Project; Technical Specification Group Services and System Aspects; Circuit Switched Fallback in Evolved Packet System; Stage 2 (Release 8). 3GPP TS 23.272 v8.1.0 (Sep. 2008).

3rd Generation Partnership Project; Technical Specification Group Services and System Aspects; Single Radio Voice Call Continuity (SRVCC); Stage 2 (Release 8). 3GPP TS 23.216 v8.1.0 (Sep. 2008).

\* cited by examiner

MOBILITY SOLUTION INDICATOR FOR VOICE OVER EVOLVED PACKET SYSTEM (EPS)

This application claims the benefit of U.S. Provisional Application No. 61/146,462, filed Jan. 22, 2009, the disclosure of which is fully incorporated herein by reference.

TECHNICAL FIELD

The present invention relates in general to the telecommunications field and, in particular, to a Mobile Management Entity (MME) and a method for receiving a handoff request for an active voice session of a terminal (UE) which is moving from an E-UTRAN to a GERAN/UTRAN and determining if the handoff request is applicable to a SRVCC procedure or a CSoLTEvGAN procedure.

BACKGROUND

Figure 1:
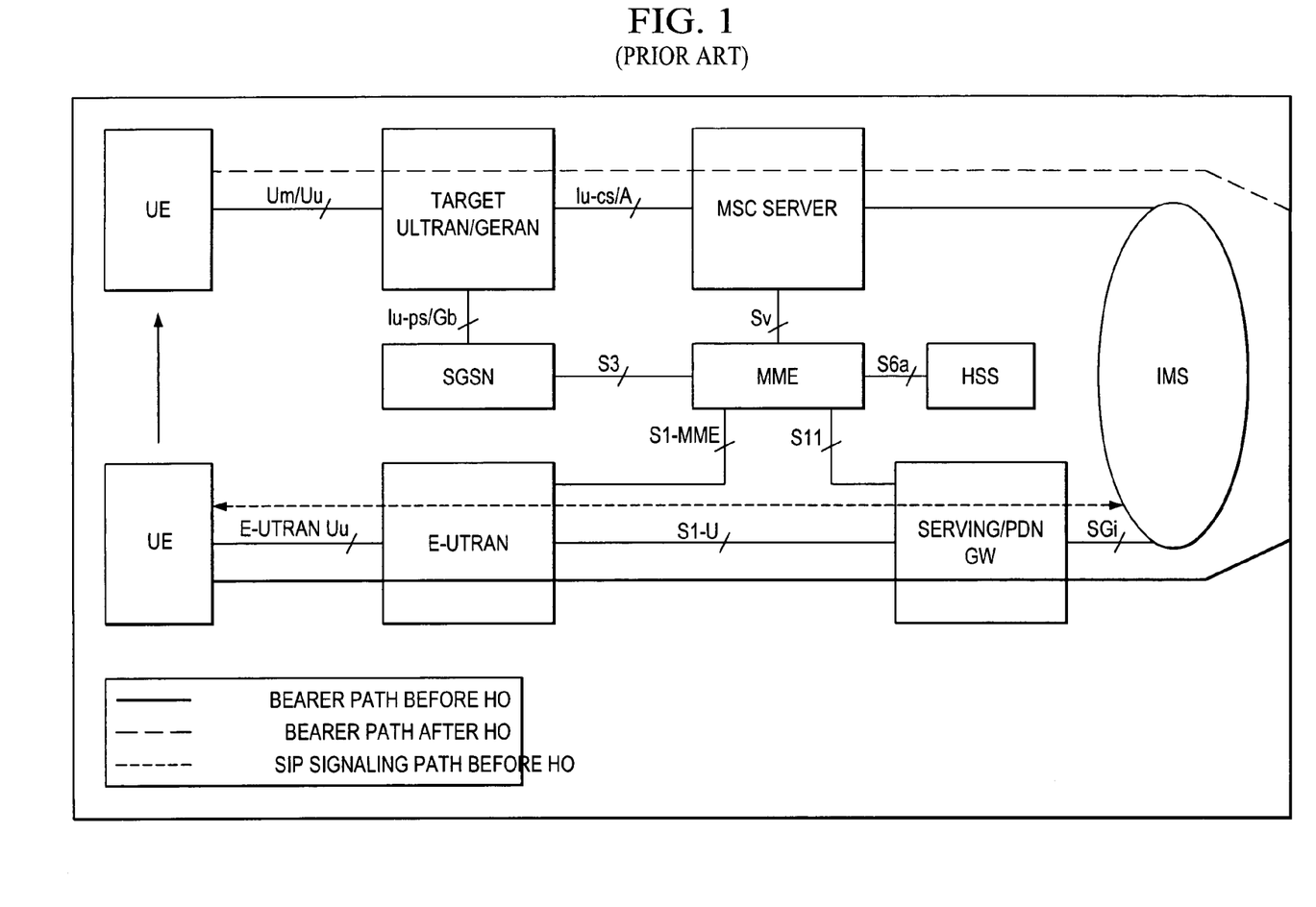
FIG. 1 (PRIOR ART) is a diagram of an architecture illustrating the SRVCC solution described in 3GPP TS 23.216 v. 8.1.0, "Single Radio Voice Call Continuity (SRVCC)" Sep. 24, 2008.
Figure 2:
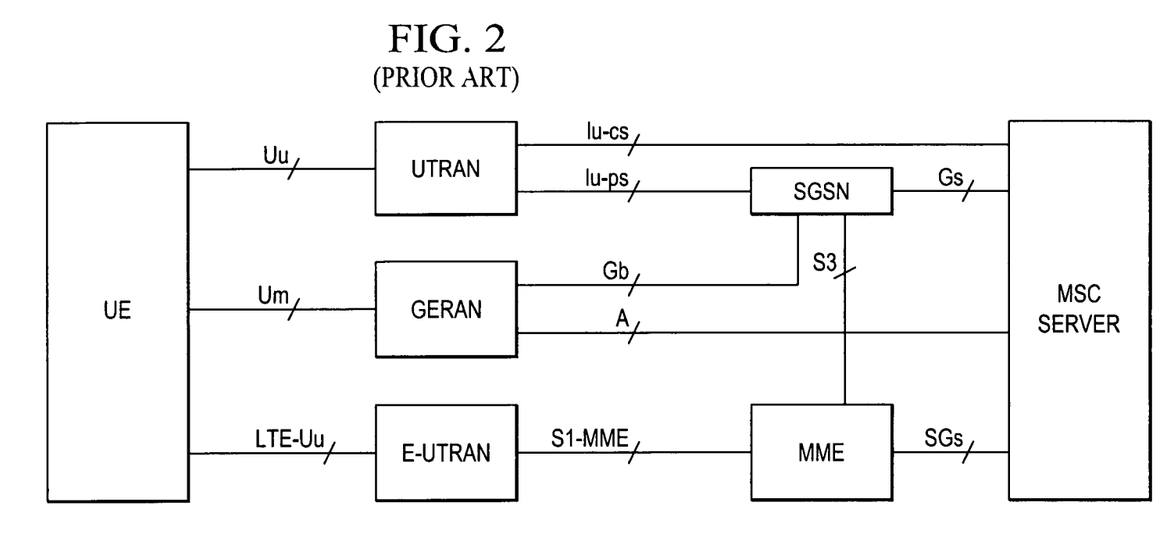
FIG. 2 (PRIOR ART) is a diagram of an architecture illustrating the CS Fallback solution described 3GPP TS 23.272 v. 8.1.0, "Circuit Switched Fallback in Evolved Packet System" Sep. 24, 2008.

The following abbreviations are herewith defined, at least some of which are referred to within the following description of the prior art and the present invention.
- 3GPP 3rd Generation Partnership Project
- A-GW Access Gateway
- CDMA Code Division Multiple Access
- CS Circuit Switched
- EPS Evolved Packet System
- E-UTRAN Evolved-UMTS Radio Access Network
- GAN Generic Access Network
- GANC Generic Access Network Controller
- GERAN GSM EDGE Radio Access Network
- GSM Global System for Mobile Communications
- HO Handoff
- HSS Home Subscriber Server
- IMS IP Multimedia Subsystem
- IP Internet Protocol
- IP-CAN IP-Connectivity Access Network
- LTE Long-Term Evolution
- NAS Non Access Stratum
- MSC Mobile Switching Centre
- MME Mobile Management Entity
- PCEF Policy and Charging Enforcement Function
- PDN-GW Packet Data Network-Gateway
- PCRF Policy and Charging Rules Function
- PS Packet Switched
- PSTN Public Switched Telephone Network
- QCI Quality of Service Class Identifier
- RRC Radio Resource Control
- SGSN Serving GPRS Support Node
- SIP Session Initiated Protocol
- SRVCC Single Radio Voice Call Continuity
- TAU Tracking Area Update
- UE User Equipment
- UMTS Universal Mobile Telecommunications System
- UTRAN UMTS Radio Access Network
- VoIP Voice Over Internet Protocol
- WCDMA Wideband Code Division Multiple Access In 3GPP there are currently several different solutions that can be used to support a voice service via EPS (Evolved Packet System). One solution is IMS MMTel which might have to use the SRVCC (Single Radio Voice Call Continuity) solution if there are no VoIP radio bearers in the whole wide area network. The SRVCC solution targets supporting IMS Voice with a mechanism to move to the accesses GSM, WCDMA, or cdma2000 1xRTT and continue to support the voice service using a CS service bearer thus performing a handover from the PS domain (EPS) to the CS domain. FIG. 1 (PRIOR ART) is a diagram of an architecture which illustrates the SRVCC solution described in 3GPP TS 23.216 v. 8.1.0, "Single Radio Voice Call Continuity (SRVCC)" Sep. 24, 2008 (the contents of which are incorporated herein by reference). Another solution is CS Fallback in which the user is registered in the CS domain even when he/she is on the LTE PS only access and when the use receives or makes a CS call his/her terminal is moved over to a radio technology that supports CS service (GSM, WCDMA, or cdma2000 1xRTT). The terminal has fallen back to CS. FIG. 2 (PRIOR ART) is a diagram of an architecture which illustrates the CS Fallback solution described 3GPP TS 23.272 v. 8.1.0, "Circuit Switched Fallback in Evolved Packet System" Sep. 24, 2008 (the contents of which are incorporated herein by reference).

Furthermore, there are several industry initiatives which are trying to improve the CS Fallback solution by re-using some of the SRVCC mechanisms. One current industry initiative known as CSoLTEvGAN proposes to tunnel the CS service over IP and this solution is built upon the GAN standard described in TS 43.318 v.6.12.0 Generic Access Network (GAN); Stage 2 Jun. 16, 2008 (the contents of which are incorporated herein by reference). To bring the CSoLTEvGAN solution into 3GPP standardization (or to simply ensure that the terminal support for the CSoLTEvGAN solution is not misunderstood by the network as the SRVCC solution) requires an extension to the terminal capability. The extended terminal capability would indicate that the UE is either to be "SRVCC capable" or "CSoLTEvGAN capable" (or both). This is already known by some companies in the industry initiative. However, even with this extended terminal capability there is still a problem that can occur due to the co-existence of different solutions like the SRVCC solution and the CSoLTEvGAN solution. This problem which is described in detail below occurs when a terminal that supports both "SRVCC" and "CSoLTEvGAN" has an active voice session and there needs to be a handoff when the terminal moves from the coverage area of an E-UTRAN to the coverage area of a GERAN/UTRAN.

To support HO in the CSoLTEvGAN solution, the SRVCC mechanisms would be re-used in such a way that the terminal (herein also denoted UE) would fake the SRVCC capability by means of telling the network (in particular the MME) upon attachment that it is an SRVCC capable UE. This would make the MME and eNodeB (both EPS nodes) believe that the terminal is capable of the SRVCC solution. As such, when the terminal which has an active voice session leaves the E-UTRAN to a GERAN/UTRAN then the eNodeB would signal that a certain handover request sent to the MME is an SRVCC handover (or that the target cell capability does not support IMS Voice (or VoIP in general)—which option is not decided by 3GPP yet). The MME would use the information from the eNodeB together with the terminal capability to decide whether or not the "bearer splitting function" and the Sv interface (both defined for SRVCC) would be used or not.

Figure 3:
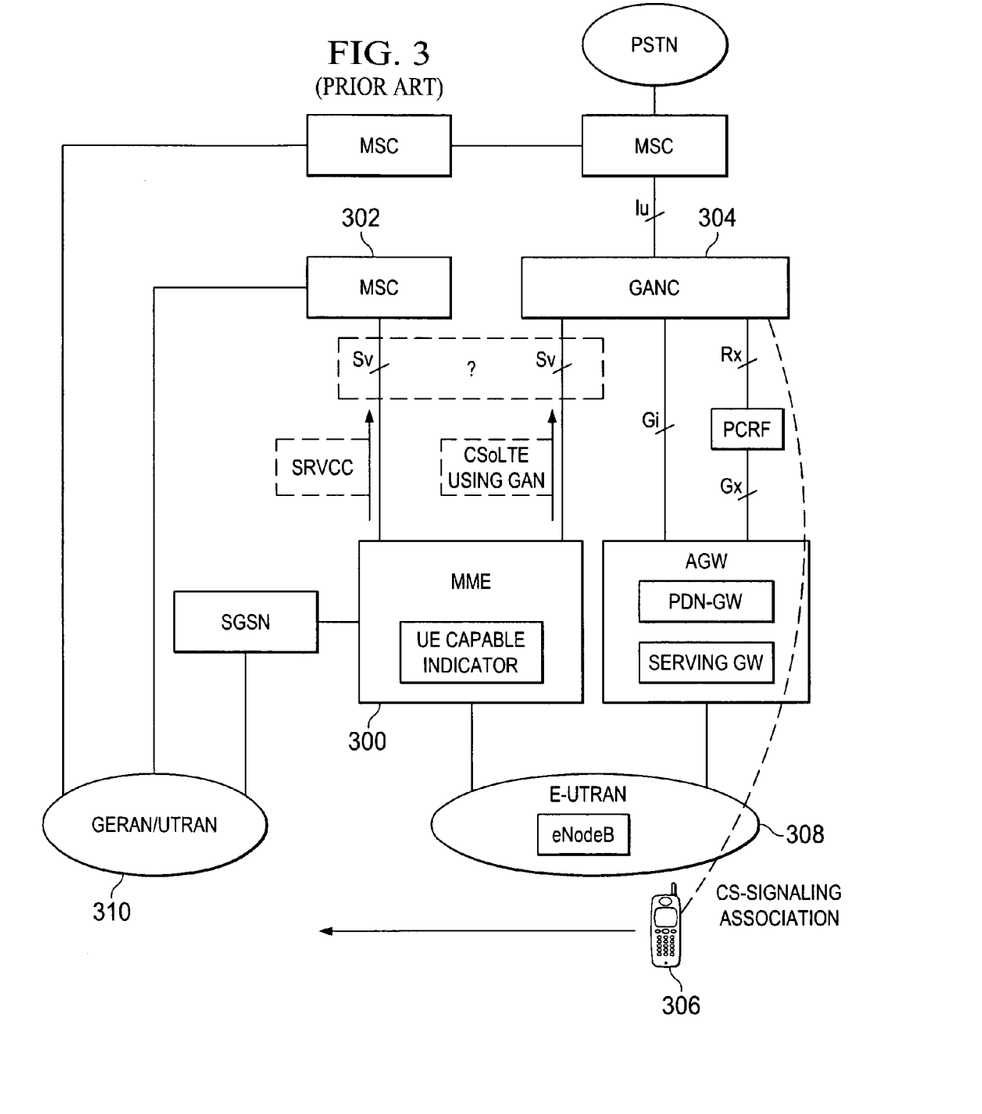
FIG. 3 (PRIOR ART) is a diagram of an architecture where both the SRVCC solution and the CSoLTEvGAN solution exist but there is a problem in which a MME does not know which node (MSC or GANC) to direct the handoff signaling when the terminal with an active voice session with the GANC moves from an E-UTRAN to a GERAN/UTRAN.

The Sv interface in the CSoLTEvGAN solution would be between the MME and the GANC. However, the Sv interface in the SRVCC solution is between the MME and the MSC (or MSC Server). Consequently, in the case where both the CSoLTEvGAN and IMS Voice (requiring SRVCC) are to be supported, the MME cannot decide which node it shall signal to use the Sv interface procedures to handoff of the active voice session of the terminal. FIG. 3 (PRIOR ART) is a diagram of an architecture where both the SRVCC solution and the CSoLTEvGAN solution exist but there is a problem in which the MME 300 does not know which node (MSC 302 or GANC 304) to direct the handoff signaling when the terminal 306 which supports both "SRVCC" and "CSoLTEvGAN" has an active voice session with the GANC 304 moves from an E-UTRAN 308 to a GERAN/UTRAN 310. Accordingly, there has been and is a need to address this shortcoming to support the co-existence of the SRVCC solution and the CSoLTEvGAN solution. This need and other needs are satisfied by the present invention.

SUMMARY

In one aspect, the present invention provides a method implemented by a MME for determining if a handoff request for an active voice session of a UE which is moving from an E-UTRAN to a GERAN/UTRAN is applicable to a SRVCC procedure or a CSoLTEvGAN procedure. The method including the steps of: (1) receiving an indication where the UE is SRVCC capable, CSoLTEvGAN capable or both; (2) determining if receive an CSoLTE indicator in addition to receiving the indication where the UE is SRVCC capable, CSoLTEvGAN capable or both; (3) if yes, then directing handoff signaling for the active voice session of the UE over a Sv interface to a GANC in accordance with the CSoLTEvGAN procedure; (4) if no, then directing the handoff signaling for the active voice session of the UE over a Sv interface to a MSC in accordance with a SRVCC procedure. This is desirable since it allows the co-existence of the SRVCC solution and the CSoLTEvGAN solution to support handover to a CS service bearer for the voice service.

In yet another aspect, the present invention provides a MME for determining if a handoff request for an active voice session of a UE which is moving from an E-UTRAN to a GERAN/UTRAN is applicable to a SRVCC procedure or a CSoLTEvGAN procedure, the MME comprising: (1) a processor; and (2) a memory that stores processor-executable instructions where the processor interfaces with the memory and executes the processor-executable instructions to: (a) receive an indication where the UE is SRVCC capable, CSoLTEvGAN capable or both; (b) determine if receive an CSoLTE indicator in addition to receiving the indication where the UE is SRVCC capable, CSoLTEvGAN capable or both; (c) if yes, then direct handoff signaling for the active voice session of the UE over a Sv interface to a GANC in accordance with the CSoLTEvGAN procedure; (d) if no, then direct the handoff signaling for the active voice session of the UE over a Sv interface to a MSC in accordance with a SRVCC procedure. This is desirable since it allows the co-existence of the SRVCC solution and the CSoLTEvGAN solution to support handover to a CS service bearer for the voice service. Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

The present invention enables the co-existence of the SRVCC solution and the CSoLTEvGAN solution by providing a way for the MME to decide which of these two solutions are applicable when an eNodeB requests Handover for a UE with an active voice session (using a bearer with QCI=1, or equal or a bearer with an operator configured QCI) that is moving from a coverage area of an E-UTRAN to a coverage area of a GERAN/UTRAN. The present invention assumes that the terminal capability is extended as described above in which the MME knows if the UE is either SRVCC capable, CSoLTEvGAN capable (or both). A detailed discussion about how all of this is accomplished is discussed next.

Figure 4:
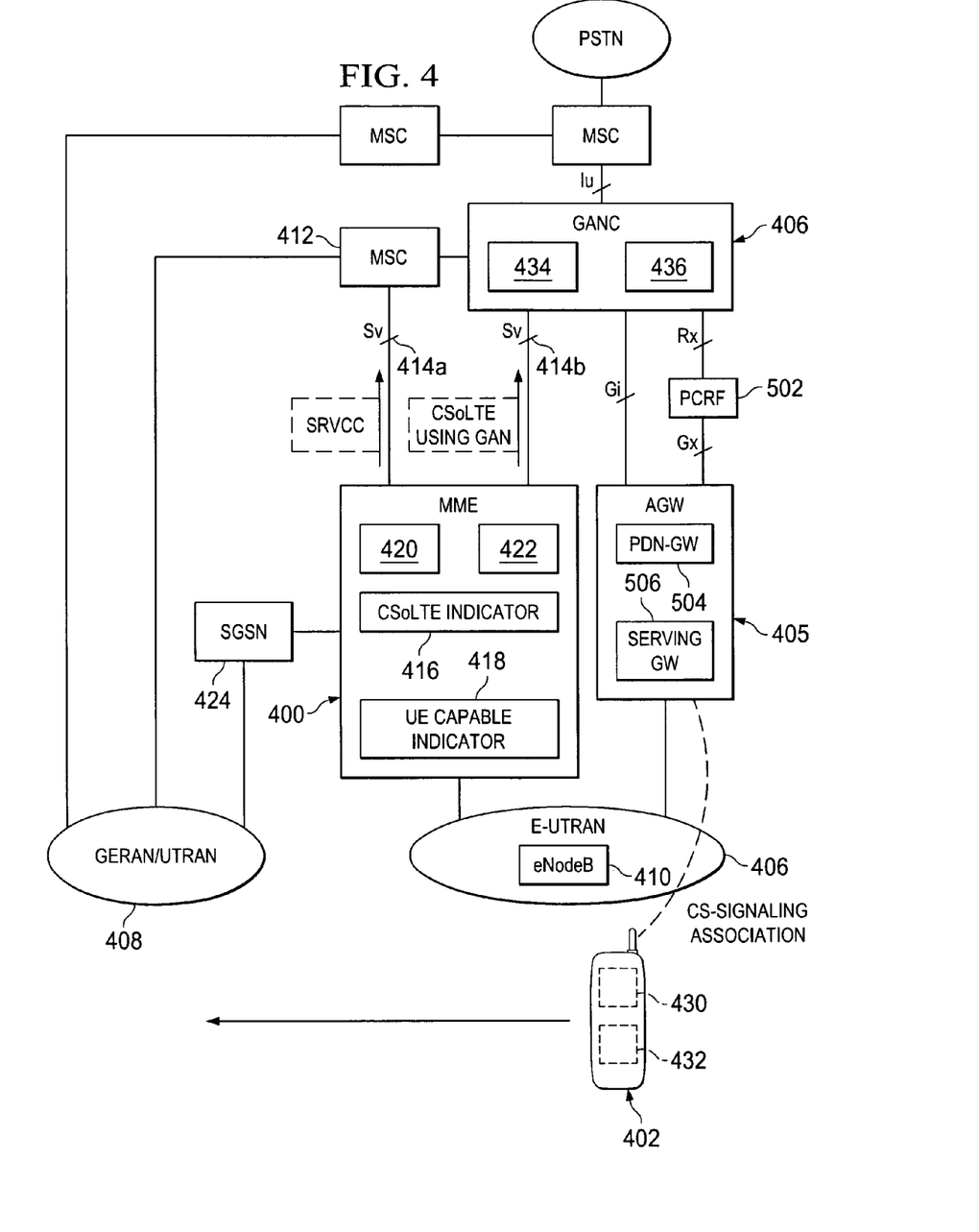
FIG. 4 is a diagram of an architecture where both the SRVCC solution and the CSoLTEvGAN solution co-exist and the MME knows which node (MSC or GANC) to direct the handoff signaling when the terminal which has an active voice session with the GANC moves from an E-UTRAN to a GERAN/UTRAN in accordance with the present invention.

Referring to FIG. 4, there is a diagram used to explain how the MME 400 enables the co-existence of the SRVCC solution and the CSoLTEvGAN solution in accordance with the present invention. In this architecture, a UE 402 is connected to a GANC 404 via an AGW 405 during a call setup in which an active voice session is established on the user plane in an E-UTRAN 406. Once the call (CS voice session) is established, the UE 402 may leave the coverage area of the E-UTRAN 406 to enter the coverage area of a GERAN/UTRAN 408. This triggers the eNodeB 410 to send a handoff (HO) request to the MME 400. At this point, the MME 400 has to decide if this HO is for the IMS based SRVCC solution in which case the handoff signaling is directed to MSC 412 over the Sv interface 414a or if this handoff signaling is for the CSoLTEvGAN solution in which case the handoff signaling would be directed to the GANC 404 over the Sv interface 414b. In accordance with the present invention, the MME 400 is provided with a CSoLTE indicator 416 which along with terminal information 418 (UE capable indicator 418) indicating whether the UE is SRVCC capable, CSoLTEvGAN capable (or both) helps in determining if the SRVCC solution should occur and the HO signaling directed to the MSC 412 or if the CSoLTEvGAN solution should occur and the HO signaling directed to the GANC 404. Typically, the UE capabilities including the terminal information 418 (UE capable indicator 418) are provided when a connection is established with the network.

In one embodiment, the MME 400 has one or more processors 420 and at least one memory 422 (storage 422) that includes processor-executable instructions where the processor(s) 420 are adapted to interface with the at least one memory 422 and execute the processor-executable instructions to: (1) receive an indication 418 (terminal information 418) where the UE 402 is SRVCC capable, CSoLTEvGAN capable or both; (2) determine if receive the CSoLTE indicator 416 in addition to receiving the indication 418 (terminal information 418) where the UE 402 is SRVCC capable, CSoLTEvGAN capable or both; (3) if yes, then direct handoff signaling for the active voice session of the UE 402 over the Sv interface 414b to the GANC 404 in accordance with the CSoLTEvGAN procedure; (4) if no, then direct the handoff signaling for the active voice session of the UE 402 over the Sv interface 414a to the MSC 412 in accordance with the SRVCC procedure; and (5) if fail to receive both the CSoLTE indicator 416 and the indicator 418 (terminal information 418) then direct the handoff signaling for the active voice session of the UE 402 to SGSN 424 (note: the one or more processors 420 and the at least one memory 422 are implemented, at least partially, as software, firmware, hardware, or hard-coded logic).

Figure 5:
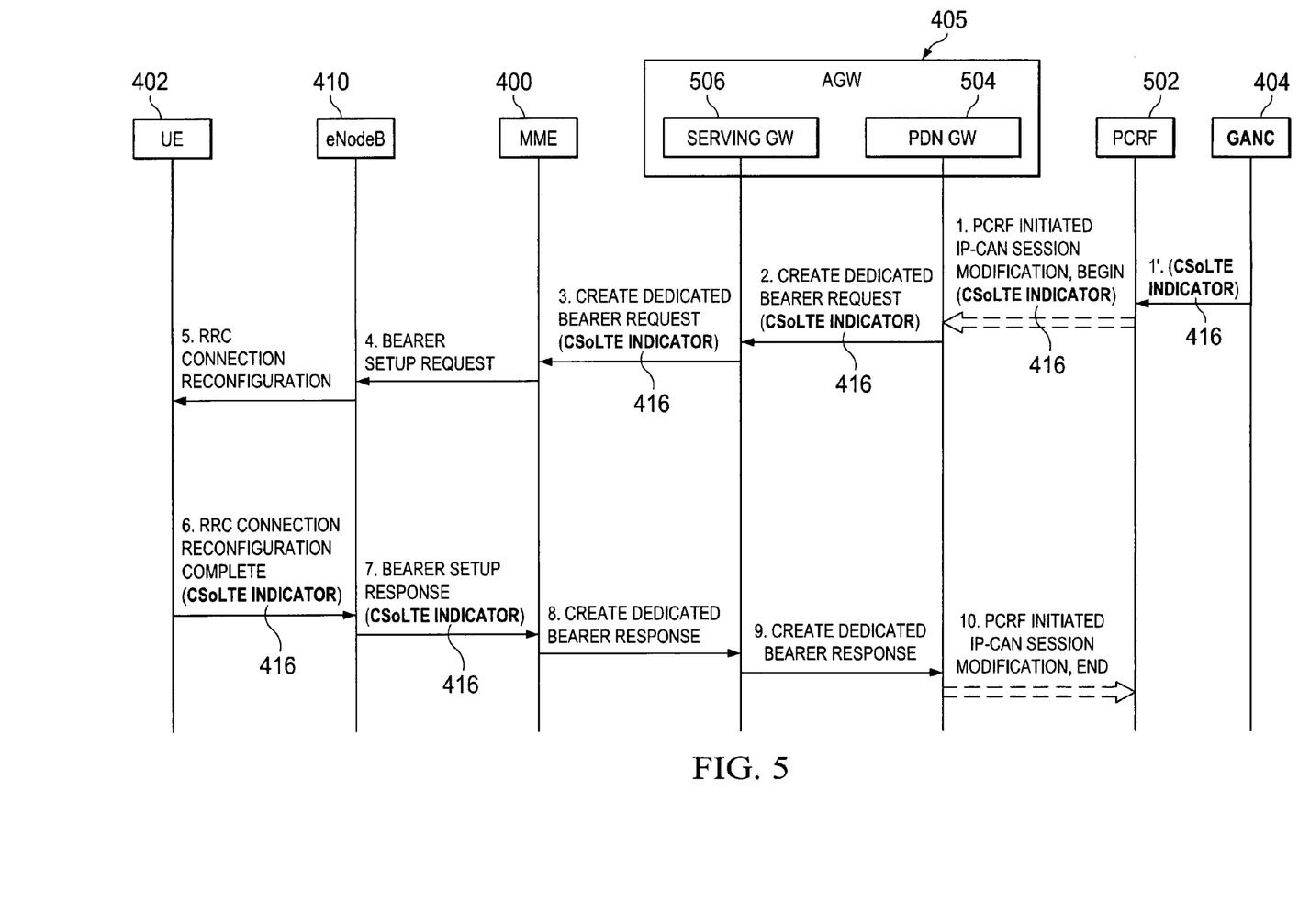
FIG. 5 is a signal flow diagram that shows a standard network based bearer establishment process which has been enhanced to indicate several different ways of providing an CSoLTE indicator to the MME in accordance with different embodiments of the present invention.

The CSoLTE indicator 416 on the usage CS over LTE of a certain voice bearer (QCI=1, or equal or operator configured QCI) is sent to the MME 400 from either the GANC 404 or the UE 402. There are several ways that can be used to provide the CSoLTE indicator 416 to the MME 400. For instance, the CSoLTE indicator 416 can be provided:

As part of a Network Initiated Dedicated Bearer Activation from either the UE 402, the GANC 404, or the PCRF 502 (see FIG. 5).

Figure 6:
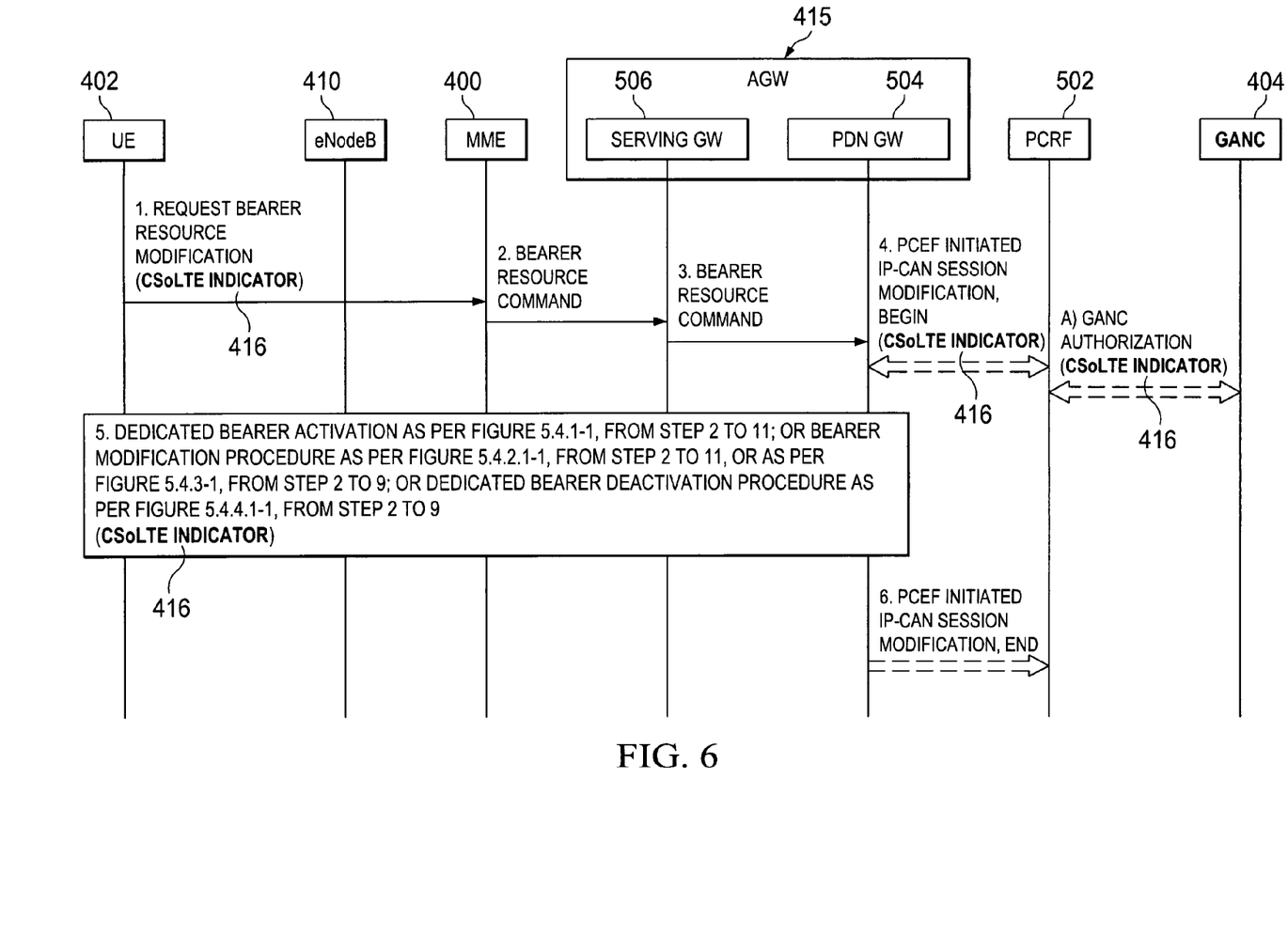
FIG. 6 is a signal flow diagram that shows a standard UE requested bearer activation process which has been enhanced to indicate several different ways of providing an CSoLTE indicator to the MME in accordance with different embodiments of the present invention.

As part of a UE Requested Bearer Resource Activation (see FIG. 6).

As NAS message within which the CSoLTE indicator 416 is sent from the UE 402 to the MME 400. For instance, the NAS signal message can be an attach message, a Tracking Area Update message, or another NAS signal message (existing or a new that is dedicated to the transfer of the CSoLTE indicator 416). Plus, if the UE 402 does a tracking update it could use NAS message to signal the indicator 418 (UE is either SRVCC capable, CSoLTEvGAN capable (or both)) and the CSoLTE indicator 416 which indicates that CSoLTEvGAN process is applicable.

Referring to FIG. 5, there is a signal flow diagram that shows the standard network based bearer establishment process which has been enhanced to indicate several different ways of providing the CSoLTE indicator 416 (bold text) to the MME 400 in accordance with different embodiments of the present invention. The standard network based bearer establishment process (regular text) itself is not described in detail herein since it is well known to those skilled in the art and discussed in detail within 3GPP TS 23.401 v8.3.0 "General Packet Radio Service (GPRS) enhancements for Evolved Universal Terrestrial Radio Access Network (E-UTRAN) access" (the contents of which are incorporated herein by reference).

In this case, where bearers are dynamically established, i.e. established when establishing the voice session, the CSoLTE indicator 416 can be provided from the GANC 404 (which is added as an AF to the PCRF 502) to the MME 400 either as part of the bearer establishment signaling, via the PCRF 502, PDN GW 504, and the Serving GW 506 (if different from the PDN GW 504)—corresponding to steps 1', 1, 2, and 3. In this example, the AGW 405 includes both the PDN GW 504 and the Service GW 506. Alternatively, the CSoLTE indicator 416 can be provided from the PCRF 502 (if bearer resources are requested by a GANC 404, which is added as an AF to the PCRF 502) to the MME 400 either as part of the bearer establishment signaling, via the PDN GW 504, and the Serving GW 506 (if different from the PDN GW 504)—corresponding to steps 1, 2, and 3. Alternatively, the CSoLTE indicator 416 can also be provided from the UE 402 to the MME 400 as part of the acknowledgment of the bearer establishment via the eNodeB 410—corresponding to steps 6 and 7.

Referring to FIG. 6, there is a signal flow diagram that shows a standard UE requested bearer activation process which has been enhanced to indicate several different ways of providing the CSoLTE indicator 416 to the MME 400 in accordance with different embodiments of the present invention. The standard UE requested bearer activation process (regular text) itself is not described in detail herein since it is well known to those skilled in the art and discussed in great detail within 3GPP TS 23.401 v8.3.0 "General Packet Radio Service (GPRS) enhancements for Evolved Universal Terrestrial Radio Access Network (E-UTRAN) access" (the contents of which are incorporated herein by reference).

In case of UE requested bearers, the CSoLTE indicator 416 could be provided as part of the UE request for bearer resources activation in step 1. Furthermore, in the UE requested bearers case the CSoLTE indicator 416 on the usage of a certain voice bearer (QCI=1, or equal or operator configured QCI) can be provided by dedicated NAS signaling messages from the UE 402 to the MME 400 (via the eNodeB 410) in step 1, or from the GANC 404 to the MME 400 via the PCRF 502, the PDN GW 504, and the Serving GW 506 (if different from the PDN GW 504) in steps A, 4 and 5, or from the GANC 404 (added as an AF to the PCRF 502) to the MME 400 via the PCRF 502, the PDN GW 504, and the Serving GW 506 (if different from the PDN GW 504) in steps 4 and 5.

From the foregoing, one skilled in the art will readily appreciate that the present invention enables the co-existence of the SRVCC solution and the CSoLTEvGAN solution to support handover to a CS service bearer for the voice service by providing a way for the MME 400 to decide which of these two solutions are applicable when the eNodeB 410 requests Handover for the UE 402 with an active voice session (using a bearer with QCI=1, or equal) that is moving from the coverage area of the E-UTRAN 406 to the coverage area of the GERAN/UTRAN 408. To accomplish this, the MME 400 would implement two IF statements when the UE 402 with an active voice session has a HO from the E-UTRAN 406 to the GERAN/UTRAN 408 which are as follows: IF (SRVCC to be done eceived indicator 418 previously at e.g. Attach) THEN IF (CS over LTE indicator 416 received) THEN Direct HO to GANC 404 ELSE Direct HO to MSC 412 ELSE Direct HO to SGSN 424 (which is how the SRVCC solution is defined in case the UE 402 happens to have a bearer with QCI=1, but is not SRVCC capable). It is assumed that the SRVCC procedures as such will be unmodified since it otherwise could create problems for an already deployed SRVCC solution. The present invention has many advantages one of which is that it enables an operator to introduce the CSoLTEvGAN solution to support CS voice over EPS as a first solution to provide the voice service to terminals connected in the LTE access and later on introduce another VoIP service, e.g. IMS MMTel.

Moreover, the present invention provides a UE 402 which has an active voice session and is moving from an E-UTRAN 406 to a GERAN/UTRAN 408 and includes: (1) a processor 430; and (2) a memory 432 that stores processor-executable instructions where the processor interfaces with the memory and executes the processor-executable instructions to: (a) send an indication 418 to a MME 400 indicating that the UE 402 is SRVCC capable, CSoLTEvGAN capable or both; and (b) send an CSoLTE indicator 416 to the MME 400 so that when the MME 400 receives a handoff request from the eNodeB 410 the MME 400 directs handoff signaling for the active voice session of the UE 402 over a Sv interface 414b to a GANC 404 in accordance with a CSoLTEvGAN procedure rather than direct the handoff signaling for the active voice session of the UE 402 over a Sv interface 414a to a MSC 412 in accordance with a SRVCC procedure.

Furthermore, the present invention provides a GANC 404 which supports a UE 402 that has an active voice session and is moving from an E-UTRAN 406 to a GERAN/UTRAN 408 and includes: (1) a processor 434; and (2) a memory 436 that stores processor-executable instructions where the processor 434 interfaces with the memory 436 and executes the processor-executable instructions to: (a) send an CSoLTE indicator 416 to a MME 400 so that when the MME 400 receives a handoff request from the eNodeB 410 the MME 400 directs handoff signaling for the active voice session of the UE 402 over a Sv interface 414b to the GANC 404 in accordance with a CSoLTEvGAN procedure rather than direct the handoff signaling for the active voice session of the UE 402 over a Sv interface 414a to a MSC 412 in accordance with a SRVCC procedure.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A method implemented by a Mobile Management Entity (MME) for determining if a handoff request for an active voice session of a user equipment (UE) is applicable to a Single Radio Voice Call Continuity (SRVCC) procedure or a Circuit Switched over Long-Term Evolution via Generic Access Network (CSoLTEvGAN) procedure, the method comprising the steps of:
   wherein the UE, is moving from an Evolved-UMTS Radio Access Network (E-UTRAN) to a GSM Radio Access Network/UMTS Radio Access Network (GERAN/UTRAN);
   receiving an indication where the UE is SRVCC capable and CSoLTEvGAN capable;
   determining if an CSoLTE indicator is received in addition to receiving the indication where the UE is SRVCC capable and CSoLTEvGAN capable;
   in response to determining CSoLTE indicator has been received in addition to receiving the indication where the UE is SRVCC capable and CSoLTEvGAN capable, directing handoff signaling for the active voice session of the UE over a Sv interface to a Generic Access Network Controller (GANC) in accordance with the CSoLTEvGAN procedure; and
   in response to determining the CSoLTE indicator has not been received in addition to receiving the indication where the UE is SRVCC capable and CSoLTEvGAN capable, directing the handoff signaling for the active voice session of the UE over a Sv interface to a Mobile Switching Centre (MSC) in accordance with a Single Radio Voice Call Continuity (SRVCC) procedure;
   directing the handoff signaling for the active voice session of the UE to a service GPRS support node (SGSN) when failing to receive both the indication where the UE is SRVCC capable and CSoLTEvGAN capable and the CSoLTE indicator.

2. The method of claim 1, wherein the CSoLTE indicator is received from the GANC via a Policy and Charging Rules Function, a Packet Data Network-Gateway, and a Serving GW if different from the Packet Data Network-Gateway as part of a network initiated dedicated bearer activation.

3. The method of claim 1, wherein the CSoLTE indicator is received from the Policy and Charging Rules Function when being connected to the GANC for a certain IP-CAN session, via a Packet Data Network-Gateway, and a Serving GW if different from the Packet Data Network-Gateway as part of a network initiated dedicated bearer activation.

4. The method of claim 1, wherein the CSoLTE indicator is received from the UE via an eNodeB during acknowledgment of a network initiated dedicated bearer activation.

5. The method of claim 1, wherein the CSoLTE indicator is received from the UE which used Non-Access Stratum (NAS) signaling via an eNodeB during a UE requested bearer resource activation.

6. The method of claim 1, wherein the CSoLTE indicator is sent from the UE to the MME in a NonAccess Stratum (NAS) message.

7. The method of claim 6, wherein the NAS message is an attach message.

8. The method of claim 6, wherein the NAS message is a Tracking Area Update (TAU) message.

9. The method of claim 1, wherein the active voice session uses a bearer with a Quality of Service Class Identifier (QCI) equal to one.

10. The method of claim 1, wherein the active voice session uses a bearer with an operator configured Quality of Service Class Identifier.

11. A Mobile Management Entity (MME) for determining if a handoff request for an active voice session of a user equipment (UE) is applicable to a Single Radio Voice Call Continuity (SRVCC) procedure or a Circuit Switched over Long-Term Evolution via Generic Access Network (CSoLTEvGAN) procedure, the MME further comprising:
   a processor; and
   a memory that stores processor-executable instructions where the processor interfaces with the memory and executes the processor-executable instructions to:
   receive an indication where the UE is SRVCC capable and CSoLTEvGAN capable, wherein the UE is moving from an Evolved UMTS Radio Access Network (E-UTRAN) to a GSM Radio Access Network/UMTS Radio Access network (GERAN/UTRAN);
   determine if an CSoLTE indicator has been received in addition to receiving the indication where the UE is SRVCC capable and CSoLTEvGAN capable;
   responsive to a determination that the CSoLTE indicator has been received in addition to receiving the indication where the UE is SRVCC capable and CSoLTEvGAN capable, direct handoff signaling for the active voice session of the UE over a Sv interface to a Generic Access Network Controller (GANC) in accordance with the CSoLTEvGAN procedure;
   responsive to a determination that the CSoLTE indicator has not been received in addition to receiving the indication where the UE is SRVCC capable and CSoLTEvGAN capable, direct the handoff signaling for the active voice session of the UE over a Sv interface to a Mobile Switching Centre (MSC) in accordance with a Single Radio Voice Call Continuity (SRVCC) procedure;

direct the handoff signaling for the active voice session of the UE to a service GPRS support node (SGSN) when failing to receive both the indication where the UE is SRVCC capable and CSoLTEvGAN capable and the CSoLTE indicator.

12. The MME of claim 11, wherein the CSoLTE indicator is received from the GANC via a Policy and Charging Rules Function, a Packet Data Network-Gateway, and a Serving GW if different from the Packet Data Network-Gateway as part of a network initiated dedicated bearer activation.

13. The MME of claim 11, wherein the CSoLTE indicator is received from the Policy and Charging Rules Function when being connected to the GANC for a certain IP-CAN session, via a Packet Data Network-Gateway, and a Serving GW if different from the Packet Data Network-Gateway as part of a network initiated dedicated bearer activation.

14. The MME of claim 11, wherein the CSoLTE indicator is received from the UE via an eNodeB during acknowledgment of a network initiated dedicated bearer activation.

15. The MME of claim 11, wherein the CSoLTE indicator is received from the UE which used Non-Access Stratum (NAS) signaling via an eNodeB during a UE requested bearer resource activation.

16. The MME of claim 11, wherein the CSoLTE indicator is sent from the UE to the MME in a NonAccess Stratum (NAS) message.

17. The MME of claim 16, wherein the NAS message is an attach message.

18. The MME of claim 16, wherein the NAS message is a Tracking Area Update (TAU) message.

19. The MME of claim 11, wherein the active voice session uses a bearer with a Quality of Service Class Identifier (QCI) equal to one.

20. The MME of claim 11, wherein the active voice session uses a bearer with an operator configured Quality of Service Class Identifier.

* * * * *